United States Patent [19]

Pfeifer et al.

[11] 4,012,090
[45] Mar. 15, 1977

[54] KNOCKDOWN PUT-TOGETHER DRAWER

[76] Inventors: Raymond Pfeifer, 5530 S. Lake Shore Drive, Chicago, Ill. 60616; Roger Ringger, 7480 SW. Fifth St., Plantation, Fla. 33314

[22] Filed: Nov. 5, 1975

[21] Appl. No.: 629,145

[52] U.S. Cl. .............................. 312/330 R; 52/285; 52/586; 312/263; 52/261
[51] Int. Cl.² ...................... A47B 47/04; B65D 9/34
[58] Field of Search ............... 312/111, 140, 257 R, 312/263, 265, 330; 108/153, 157; 52/753 E, 753 D, 753 C, 757, 586

[56] References Cited

UNITED STATES PATENTS

| 2,470,514 | 5/1949 | Muller | 52/753 E |
|---|---|---|---|
| 3,282,635 | 11/1966 | Himelreich | 312/330 |
| 3,535,204 | 10/1970 | Truxa | 52/586 |
| 3,674,328 | 7/1972 | White et al. | 312/263 |
| 3,713,718 | 1/1973 | Lucci | 312/263 |
| 3,822,924 | 7/1974 | Lust | 312/263 |

FOREIGN PATENTS OR APPLICATIONS 861,911   7/1970   Scotland ........................... 312/263

*Primary Examiner*—Casmir A. Nunberg
*Attorney, Agent, or Firm*—Max R. Kraus

[57] ABSTRACT

A knockdown put-together drawer for use with an article of furniture, which utilizes slidable drawers such as dressers, cabinets, desks and the like. The drawer comprising a pair of spaced sides, a bottom, a back and a front in which the parts are formed with cooperating undercuts or channels and grooves which when interfitted receive an insertable and removable interlocking or connecting U-shaped member which, when inserted, interlocks the interfitting parts to form a rigid drawer. The parts may be shipped and stored in their disasseembled and knockdown condition and readily assembled by inserting the interlocking member.

4 Claims, 10 Drawing Figures

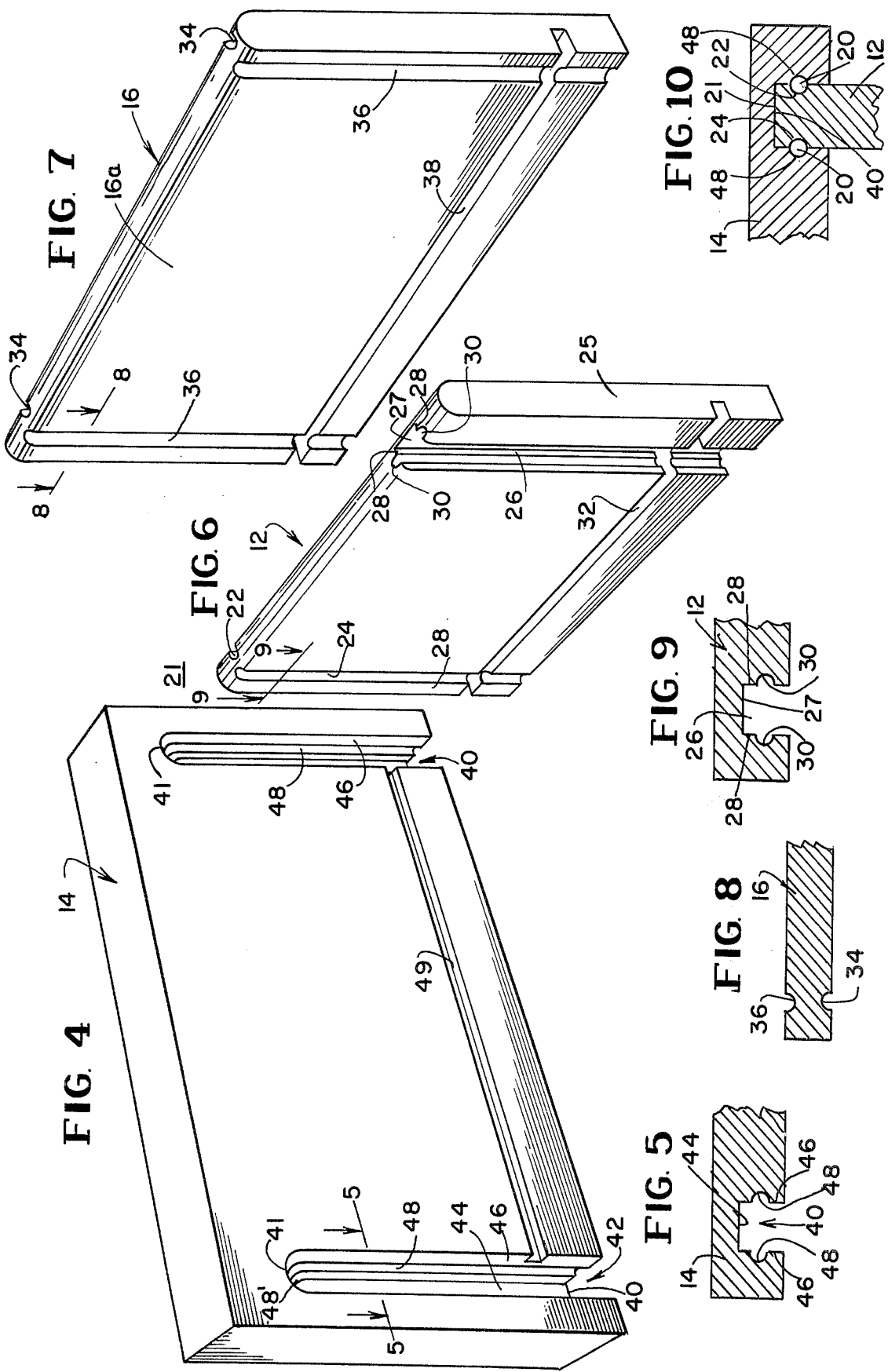

KNOCKDOWN PUT-TOGETHER DRAWER

BRIEF SUMMARY OF THE INVENTION

One of the objects of this invention is to provide a drawer for an article of furniture, such as a dresser, cabinet, desk and the like in which the drawer is made of parts which can be packaged and shipped in a knockdown disassembled condition and which may be readily and easily assembled with interlocking means which are readily insertable in the assembled parts without the use of tools and the like and when inserted, serve to interlock the parts and retain them in a rigid position. If desired, the interlocking means may be removed and the parts can again be disassembled.

With the invention the disassembled parts of the drawer may be shipped and stored to occupy a minimal space resulting in economies in shipping and storing and yet may be readily assembled by inexperienced persons.

The drawer of this invention is to be used preferably with articles of furniture which is the subject matter of another application in which the article of furniture is made of parts which can be packaged and shipped in a knockdown disassembled position and readily assembled with similar interlocking means.

BRIEF DESCRIPTION OF THE DRAWING

FIG. 4 is a view of the front of the drawer looking at same from the inside of the drawer.

FIG. 5 is a section taken on line 5—5 of FIG. 4.

FIG. 6 is a view of one of the sides of the drawer as viewed from the inside of the drawer.

FIG. 7 is a view of the back of the drawer as viewed from the inside of the drawer.

FIG. 8 is a sectional view taken on line 8—8 of FIG. 7.

FIG. 9 is a view taken on line 9—9 of FIG. 6.

FIG. 10 is a section taken on line 10—10 of FIG. 3.

DESCRIPTION OF THE PREFERRED EMBODIMENTS

Figure 1:
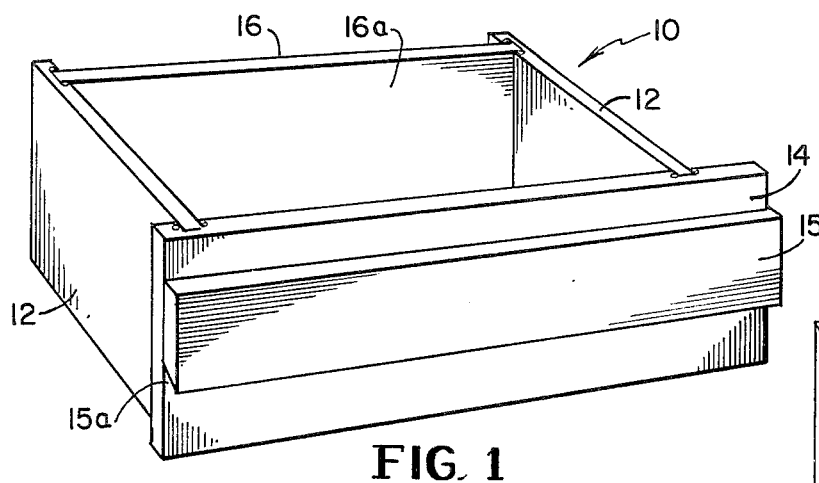
FIG. 1 is a view of the drawer assembled.

The drawer generally indicated at 10 comprises, when assembled, a pair of sides 12, a front 14, a back 16 and a bottom 18 and four U-shaped connecting pins each generally indicated at 20. The sides 12, front 14 and back 16 are provided with undercuts or rabbets or channels and with grooves formed in such a manner so that the parts are interfitted and are connected by means of the four U-shaped connecting or interlocking members or pins as will now be described in detail.

Each of the two sides 12 of the drawer are similarly constructed and a description of one will suffice to describe both sides which will have identical part designations. The side 12 (FIGS. 2, 3, 6 and 9) has adjacent the front end 21 a vertically extending, outwardly facing groove 22 and a vertically extending, inwardly facing groove 24. Adjacent the rear end 25 of the side 12 is a vertically extending, inwardly facing undercut or channel generally indicated at 26 providing an inner end wall 27 and spaced side walls 28. Each of the spaced side walls 28 has an inwardly facing vertical groove 30. The grooves 30 are diametrically opposed and face each other and receive the U-shaped connecting or interlocking pins 20 when the back is interfitted therewith as will be subsequently described. Adjacent the bottom of the side 12 on the inside thereof is a longitudinal or horizontal inwardly facing groove 32 which receives the side edge 18a of the bottom 18.

The back member 16 (FIGS. 2, 7, 8) is provided adjacent each of the opposite ends with an outwardly facing vertical groove 34 and an inwardly facing vertical groove 36. Each said pair of grooves being aligned. Adjacent the bottom on the inside is an inwardly facing horizontal or longitudinal groove 38 to receive the rear edge 18b of the bottom 18.

The front 14 of the drawer (FIGS. 2, 3, 4, 5) has adjacent each of its opposite ends a vertically extending, inwardly facing undercut or channel 40 closed and rounded at the top as at 41 and open at the bottom as at 42. The channel 40 has an inner end wall 44 (FIG. 5) and spaced side walls 46. Each of the spaced side walls has an inwardly facing vertical groove 48 which grooves continue as at 48' in the closed rounded top 41 of the channel. The grooves 48 are diametrically opposed and face each other. On the inside of the front 14 and adjacent the bottom but spaced therefrom is an inwardly facing horizontal or longitudinal groove 49 adapted to receive the front edge 18c of the bottom 18. Secured to the front 14 on the outside (FIG. 1) is a strip 15 having an undercut 15a at the bottom thereof which permits the strip to be grasped and used as a handle in manually sliding the drawer outwardly of the cabinet and the like. Each of the corners of the bottom 18 is provided with right angled indents or recesses 18d and 18e, best seen in FIG. 2.

Figure 3:
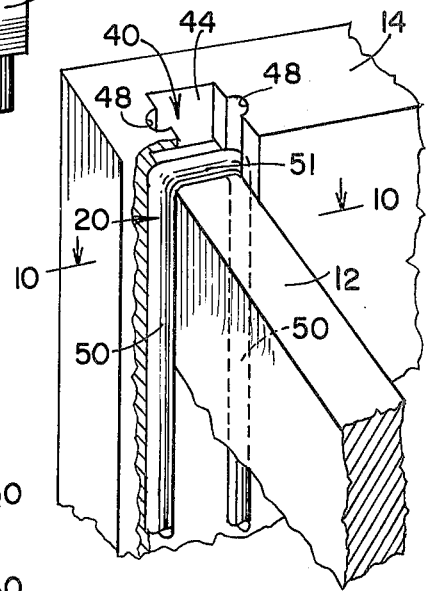
FIG. 3 is an enlarged fragmentary view showing one of the sides connected to the front by the interlocking member as when same is assembled.
Figure 2:
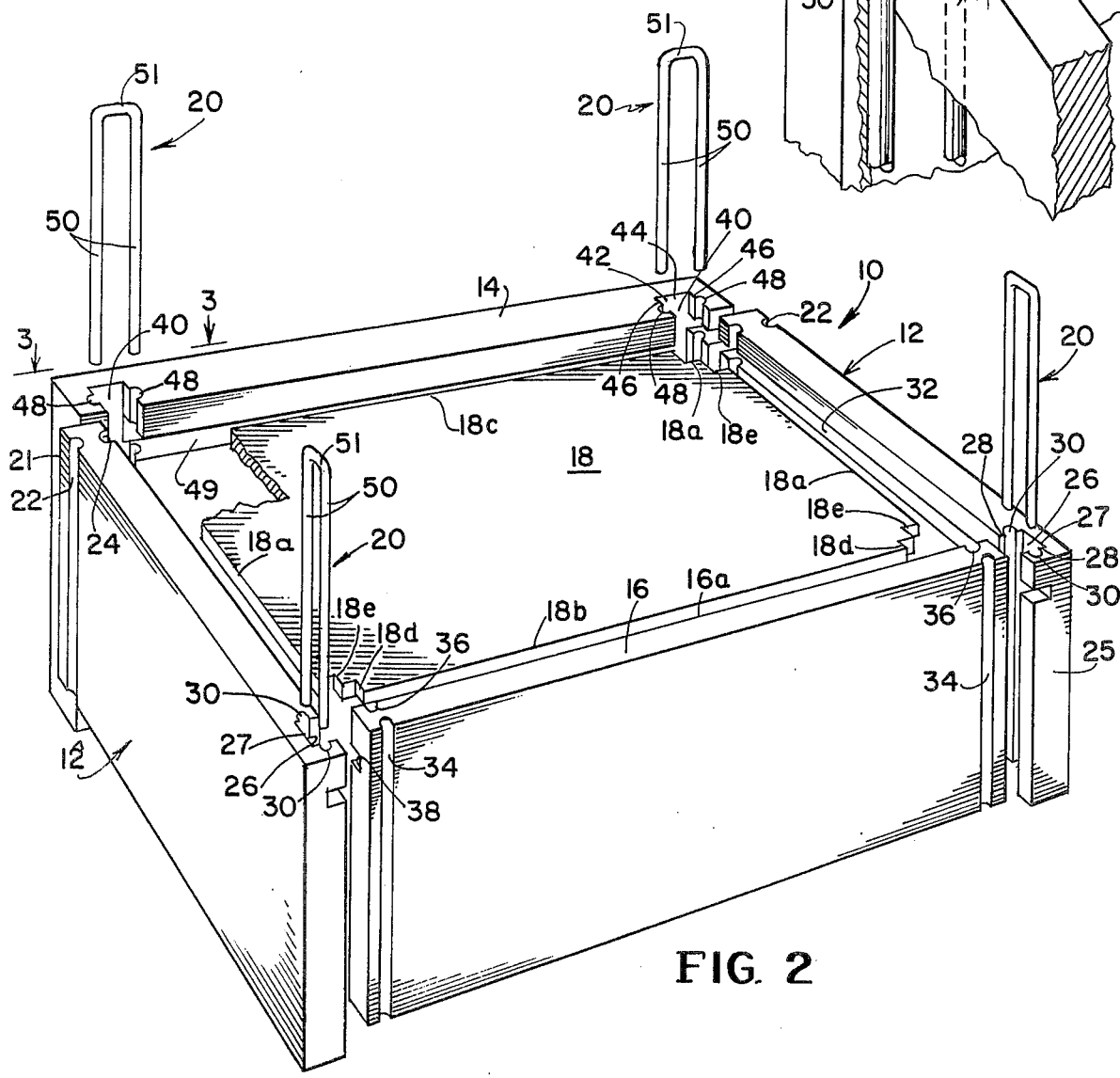
FIG. 2 is an exploded view showing the drawer in upside down position with the parts disassembled and viewing same from the rear.

The insertable interlocking or connecting members are U-shaped pins, best shown in FIGS. 2 and 3 and generally indicated at 20 and each of same is formed of a single strip of wire bent to form a pair of spaced sides or legs 50 connected at one end by a straight connecting portion 51 with the opposite or front ends of the sides or legs 50 being free for insertion into the grooves and channels for connecting the disassembled parts. The U-shaped interlocking pins 20 are made of a substantially rigid wire and the spaced sides or legs 50 can have a slight outward bow or bend to provide any preload or set to insure proper tensing or tightness when same are inserted into the grooves as previously described. The length of the legs or sides 50 of the interlocking members 20 is that of the length of the grooves with which they fit so that the interlocking connection extends the height of the sides and back and provides a rigid connection.

The parts forming the front, back and sides are made preferably of wood, or any composition material, while the bottom is made preferably of a prefabricated board. It being understood that the foregoing parts may be formed or made of plastic.

All of the parts named, the sides, back, front and bottom of the drawer, are in a disassembled condition and are put together as will now be described and interconnected by the U-shaped connecting pins 20.

ASSEMBLING

The front ends 21 of the sides 12 are inserted in the inwardly facing vertical undercuts or channels 40 of the front 14 and the vertical grooves 22 and 24 (FIG. 10) of the front of the sides 12 are aligned with the inwardly facing opposed vertical grooves 48 of the vertical channel or undercut 40 of the front 14. The rounded top of the sides 12 engage the top of the channel 40. The front end 18c of the bottom 18 of the drawer is inserted in the horizontal or longitudinal groove 49 of the front 14. The longitudinal groove 32 on each of the sides 12 would be on the same plane as the longitudinal groove 49 of the front 14. The corner cutout 18d of the bottom 18 will be aligned with one of the vertical grooves 48 of the front channel 40 and the corner cutout 18e will align with the other groove 48. The U-shaped interlocking pin 20 is inserted into the cooperating grooves 48 of the channel or undercut 40 of the front 14 and into the grooves 22 and 24 in the ends of the sides 12 as shown in FIG. 3 and when inserted (FIG. 10) locks the front 14 to the two sides 12 at their front ends and to the bottom 18. Since the bottoms of the sides 12 are above the bottom of the front 14, the end 51 of the interlocking pin 20 as shown in FIG. 3 is spaced inwardly and clears the bottom of the front 14 and does not interfere with the slidable movement of the drawer.

To complete the assembly of the drawer, the back 16 of the drawer is assembled to the foregoing in the following manner. The back 16 is slid into the rear vertical undercuts or channels 26 of the sides 12 with the inside face 16a of the back facing inwardly. The opposed inwardly facing vertical grooves 30 in the vertical channels 26 of the sides 12 will be aligned with the opposed vertical grooves 34 and 36 in the back 16. The rear edge 18b of the bottom 18 will be received in the inwardly facing longitudinal groove 38 of the back 16 and the cutout corners 18e of the bottom 18 will be in registry with the vertical groove 36 of the back 16 and the cutout corner 18d will register with the groove 30 in the channel 26 of the side 12. The U-shaped interconnecting pin 20 is inserted into the bottom as in FIG. 2 to interlock the parts. The legs 50 of the pin 20 engage the vertical grooves 30 in the channel 26 of the side 12 and the vertical grooves 34 and 36 in the back 16 to firmly interlock the parts which will remain rigidly connected together as though the parts were initially permanently assembled by permanently affixed fastening means. With this invention the parts can be shipped and stored in their knockdown disassembled condition and readily assembled by the interlocking pins. If subsequently it is desired to disassemble same, this may be readily done by removing the interlocking pins 20.

What is claimed is:

1. A knockdown put-together drawer for a dresser, cabinet, desk and the like, said knockdown drawer comprising a pair of spaced sides, a bottom, a back and a front, each of said spaced sides having an inwardly facing vertically extending channel adjacent each of the rear ends thereof to receive the opposite ends of the back, said side channels each having a pair of oppositely positioned vertically extending grooves and said back having a pair of vertically extending grooves one on each side of the back and adjacent each of its opposite ends cooperating with the pair of oppositely positioned grooves in the sides, said bottom secured to said sides, a U-shaped interlocking member having spaced generally parallel sides and a connecting end portion with said spaced parallel sides of said interlocking member insertable in said side and back grooves through the open bottom thereof to engage said cooperating grooves to interlock said parts together, with said connecting end portion engaging the bottom of said back member to limit the insertion of said U-shaped interlocking member.

2. A knockdown put-together drawer as set forth in claim 1, in which the front has a pair of spaced vertically extending channels to receive the front ends of the sides, said front channels each having a pair of inwardly facing, vertically extending grooves, said sides each having a pair of oppositely facing grooves adjacent the front end which align with the grooves in the front channels, and a U-shaped interlocking member having spaced generally parallel sides and a connecting end portion with said spaced parallel sides of said interlocking member insertable in said front side grooves and said grooves in said front channel through the open bottom thereof to interlock said front to said sides at the front thereof, with said connecting end portion engaging the bottom of said sides.

3. A knockdown put-together drawer as set forth in claim 1, in which the inside faces of the front, sides and back each have a horizontally extending groove adjacent the bottom thereof for receiving the front, sides and rear of the bottom in interlocked position.

4. A knockdown put-together drawer as set forth in claim 3, in which the bottom has corner cutouts which align with certain of the grooves to permit passage of the U-shaped interlocking member.

* * * * *